United States Patent [19]

Ahn

[11] 4,235,334
[45] Nov. 25, 1980

[54] CASSETTE STORAGE CASE

[76] Inventor: Chul S. Ahn, 1801 Dae Myung Dong, Nam Ku, Dae Ku City, Kyung Sang Puk Do, Rep. of Korea

[21] Appl. No.: 2,986

[22] Filed: Jan. 12, 1979

[51] Int. Cl.³ .................... B65D 85/67; B65D 43/10; B65D 11/20

[52] U.S. Cl. .................................. 206/387; 220/339

[58] Field of Search ....................... 206/387; 220/339

[56] References Cited

U.S. PATENT DOCUMENTS

| | | | |
|---|---|---|---|
| 3,587,841 | 6/1971 | Devejian | 206/387 |
| 3,737,067 | 6/1973 | Palson | 206/387 |
| 3,747,745 | 7/1973 | Esashi et al. | 206/387 |
| 4,102,452 | 7/1978 | Sato et al. | 206/387 |

Primary Examiner—William T. Dixson, Jr.
Attorney, Agent, or Firm—Schuyler, Banner, Birch, McKie & Beckett

[57] ABSTRACT

A tape cassette storage case is disclosed having hexagonal tape reel immobilization pillars and trapezoidal recesses for cradling a cassette and immobilizing the tape reels. Insertion of the cassette into the base of the case effectively immobilizes the tape reels without the need to close the case. When closed, the case affords effective protection from shock, dust and dirt.

8 Claims, 6 Drawing Figures

U.S. Patent  Nov. 25, 1980  Sheet 1 of 3  4,235,334 ial tops 28 which mate with recesses formed in the bottoms of the reels 126.

CASSETTE STORAGE CASE

BACKGROUND OF THE INVENTION

1. Field of the Invention

This invention relates generally to tape cassette storage cases.

2. Description of the Prior Art

The prior art is replete with various types of cases for the storage of individual tape cassettes. To a limited extent, these cases achieve the important objectives of shock protection, isolation from dust and dirt, and tape immobilization and protection.

One such case which has achieved widespread acceptance in the industry is the type disclosed in Schoenmakers U.S. Pat. No. 3,272,325. This case comprises a generally rectangular pouch which is rigidly connected to a flat lid. A mating cover member is pivotally connected to the pouch along its sides. This cover has two inwardly projecting lugs which are adapted to engage the sprockets of the tape reels when the case is closed. With the case open, a cassette is inserted into the pouch and the two portions of the case are rotated to their closed positions to form a generally rectangular, closed box.

Certain disadvantages are inherent in a case of this type. For example, prior to the closure of the case, the cassette is free to shift around within the pouch. This shifting may often cause the tape to slacken sufficiently to permit it to protrude slightly from the cassette and abrade against the inner surface of the pouch. Such a deleterious condition would persist when the case is closed, since the projecting lugs immobilize the cassette reels with the tape in a slackened condition. In addition, the mating edges of this case do not form an effective seal against dust and dirt. Furthermore, the case may inadvertently swing open because of the lack of any positive locking means.

SUMMARY OF THE INVENTION

It is therefore an object of the present invention to obviate the above noted shortcomings of the prior art by providing a cassette storage case which effectively protects the cassette from shock, dust and dirt and positively immobilizes the cassette reels and maintains the tape in a taut condition.

Another object of the invention is to provide such a case which will immobilize the cassette reels immediately upon insertion of the cassette into the case, and prior to its closure.

Another object of the invention is to provide such a case wherein the mating portions of the case effectively seal out dust and dirt when closed.

Another object of the invention is to provide such a case having positive means for locking the case in a closed position.

These and other objects of the invention are achieved by providing a cassette storage case having a generally rectangular base, opposed upstanding side walls joined to the base, an upstanding front wall joined to the base and to the side walls, an upstanding back wall joined to the base and to the side walls opposite the front wall, a pair of spaced, upstanding pillars joined to the base and located so that each pillar will mate with one of the tape reels of the cassette, a lower trapezoidal recess formed in the base and positioned to receive the trapezoidal protrusion on one side of the cassette, a cover hinged to the back wall along substantially the entire length thereof, an upper trapezoidal recess formed in the cover and positioned to receive the trapezoidal protrusion on the other side of the cassette, and means for maintaining the case in a closed position.

The cover comprises a generally rectangular top wall which is hinged along its rear edge to the top of the back wall, opposed side flanges joined to the top wall and a front flange joined to the top wall and the side flanges. The hinged edges of the back wall and the top wall are chamfered inwardly of the hinge line to provide clearance between the edges when the case is closed. Raised cassette support ribs may be provided on the base and the top wall. The pillars are hexagonal prisms with tapered tops. Each pillar may have a central hole which receives a projecting pin carried by the top wall when the case is closed. The closure means comprises a pair of slots formed in the front wall and a pair of mating hooks projecting from the edge of the front flange and adapted to mate with the slots when the case is closed. The mating edges of the side walls and front wall, and the side flanges and front flange are stepped so as to seal out dust and dirt.

BRIEF DESCRIPTION OF THE DRAWINGS

The novel features of the invention are set out with particularity in the appended claims, but the invention will be understood more fully and clearly from the following detailed description of a preferred embodiment of the invention as set forth in the accompanying drawings, in which:

DETAILED DESCRIPTION OF A PREFERRED EMBODIMENT

Figure 1:
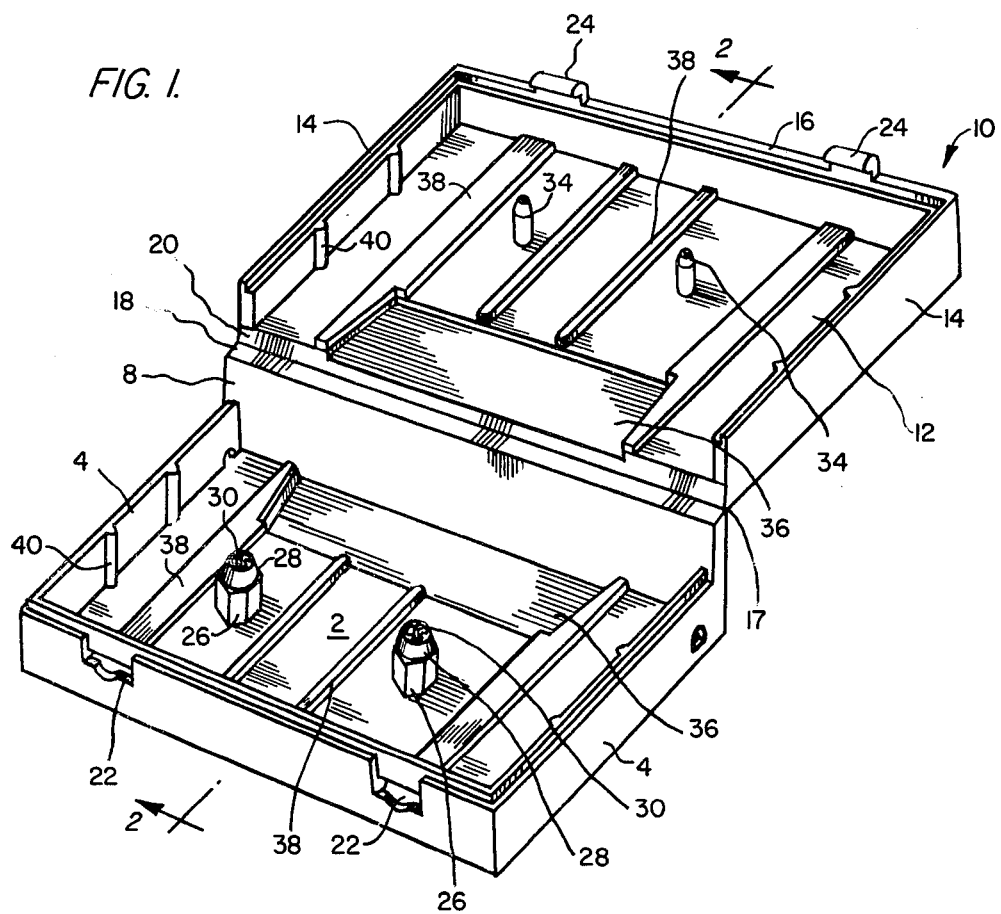
FIG. 1 is a perspective view of the cassette storage case according to the invention shown in its open position.
Figure 2:
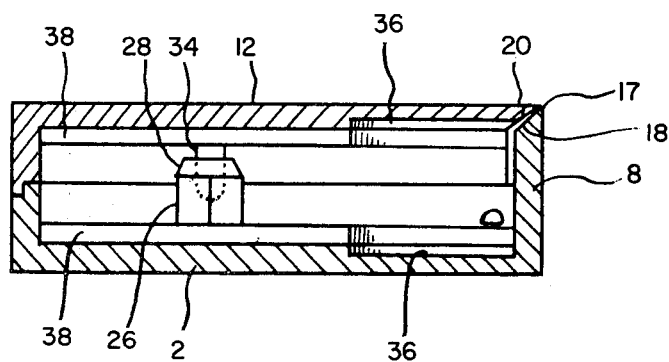
FIG. 2 is a side sectional view of the same taken along line 2—2 in FIG. 1 showing the case in its closed position.
Figure 3:
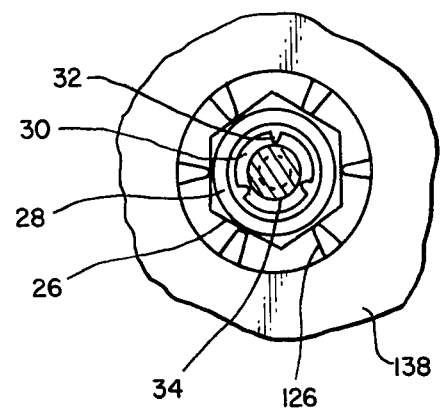
FIG. 3 is a detail plan view of the interengagement of a pillar and tape reel.
Figure 4:
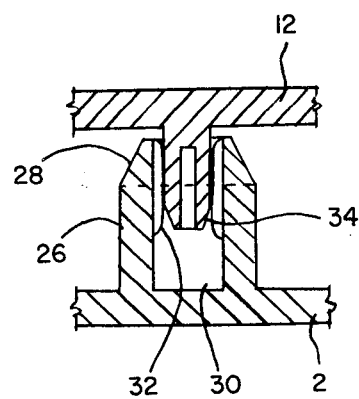
FIG. 4 is a detail side sectional view through a pillar showing the case in its closed position.
Figure 5:
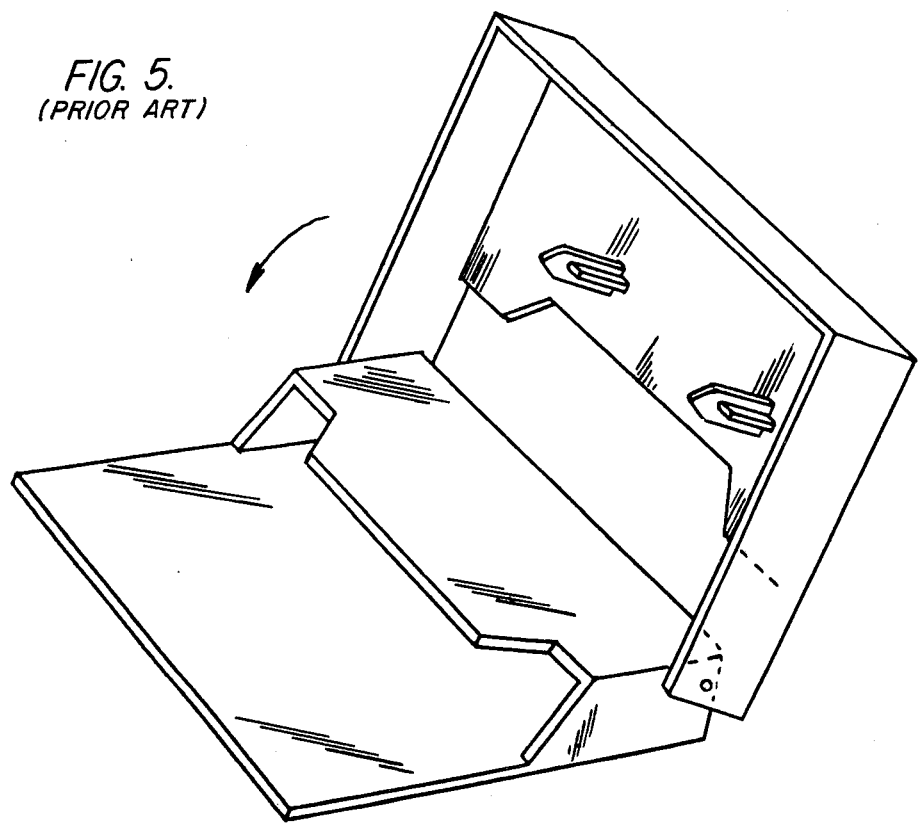
FIG. 5 is a perspective view of a cassette storage case according to the prior art.

A cassette storage case according to the invention is preferably molded of a plastic material and comprises a generally rectangular base 2 joined to opposed side walls 4, front wall 6 and back wall 8. Back wall 8 is higher than side walls 4 and 6 and is hingedly connected to a cover 10 by a thin flexible web along hinge line 17. Cover 10 comprises a top wall 12 joined to side flanges 14 and front flange 16. The edges of back wall 8 and top wall 12 are chamfered at 18 and 20, respectively, so as to provide clearance when the case is in its closed position (see FIG. 2). The upper edges of side walls 4 and front walls 6 are stepped to mate with the edges of side flanges 14 and front flange 16. Slots 22 formed in front wall 6 are adapted to matingly receive projecting hooks 24 carried by front flange 6 to hold the case securely in its closed position.

Figure 6:
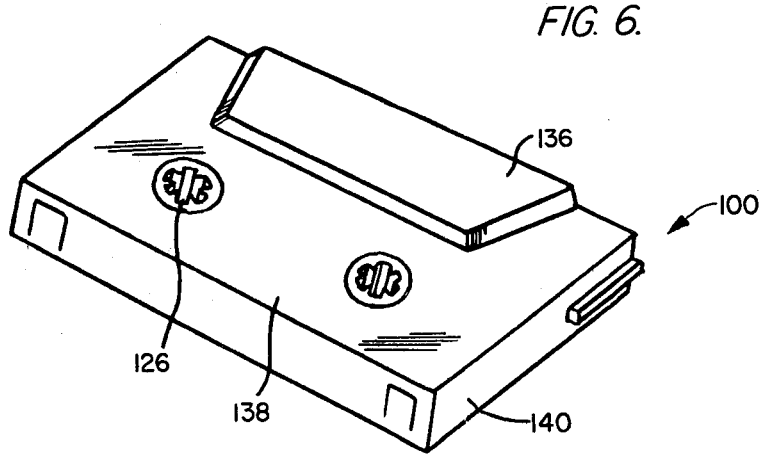
FIG. 6 is a perspective view of a tape cassette for which the case according to the invention is intended.

A pair of upstanding hexagonal pillars 26 are attached to base 2. These pillars are spaced so that they will engage the tape reels 126 of tape cassette 100 (see FIG. 6) and prevent their rotation. Pillars 26 have frustoconical tapered tops 28 and central holes 30 formed therein. Each hole 30 has three projecting ribs 32 which frictionally engage a pin 34 which projects from the inner surface of top wall 12 when the case is closed.

A lower trapezoidal recess 36 is formed in base 2. A corresponding upper trapezoidal recess 36 is formed in top wall 12. These recesses are adapted to receive the trapezoidal protrustions 136 of cassette 100. Upstanding ribs 38 carried by base 2 and top wall 12 serve to support the flat sides 138 of the cassette when the case is closed. Ribs 40 may be provided on side walls 4 and side flanges 14 for similarly engaging the side edges 140 of cassette 100.

In use, a cassette to be stored, with its tape reels tightly wound, is placed on base 2 with pillars 26 engaging tape reels 126 and one protrusion 136 engaging lower trapezoidal recess 36. When so placed, the tape reels are immediately immobilized by the pillars to retain the tape taut. No amount of movement of the open case with the cassette so placed can possibly move the tape reels or slacken the tape and permit it to protrude from the cassette and abrade against the inner surface of back wall 8. With the case closed and hooks 24 securely engaged in slots 22, the stepped mating surfaces of the walls and flanges effectively prevent the passage of dust and dirt into the case.

Although the present invention has been illustrated in terms of a preferred embodiment, it will be obvious to one of ordinary skill that numerous modifications may be made without departing from the true spirit and scope of the invention which is to be limited only by the appended claims.

I claim:

1. A storage case for an individual tape cassette having a pair of tape reels, a trapezoidal protrusion formed on each side thereof, and capstan drive and head openings along one edge thereof, said comprising:

a generally rectangular base for supporting a cassette;
   opposed upstanding side walls joined to said base and terminating in upper edges disposed below the upper surface of the cassette;
   an upstanding front wall joined to said base and said side walls and terminating in an upper edge disposed below the upper surface of the cassette;
   an upstanding back wall higher than said front and side walls joined to said base and said side walls opposite said front wall, against which said capstan drive and head openings of the cassette are positioned;
   a pair of spaced upstanding pillars joined to said base and located so that each pillar will mate with one of the tape reels of the cassette;
   a lower trapezoidal recess formed in said base adjacent to said back wall for receiving the trapezoidal protrusion on one side of the cassette;
   a cover hinged to said back wall along substantially the entire coextensive lengths thereof, said cover comprising a generally rectangular top wall hinged along its rear edge to the top edge of said back wall, an upper trapezoidal recess formed in said top wall adjacent to said back wall for receiving the trapezoidal protrusion on the other side of the cassette, opposed side flanges joined to and projecting from said top wall toward said base when said case is closed, and a front flange joined to said top wall and said side flanges; and
   closure means for maintaining said case in a closed position.

2. A case according to claim 1 wherein the hinged edges of said back wall and said top wall are chamfered inwardly of the hinge line to provide clearance between the edges when the case is closed.

3. A case according to claim 2 further comprising raised cassette supporting ribs formed on said base and said top wall.

4. A case according to claim 1 wherein said pillars are prismatic with tapered tops.

5. A case according to claim 4 wherein said pillars are hexagonal in cross-section with frusto-conical tops.

6. A case according to claim 5 further comprising a central hole formed in each pillar, and a pair of spaced projecting pins carried by said top wall and adapted to mate with said holes when the case is closed.

7. A case according to claim 1 wherein said closure means comprises a pair of slots formed in said front wall and a pair of mating hooks projecting from the edge of said front flange and adapted to mate with said slots when the case is closed.

8. A case according to claim 1 wherein the free edges of said side walls and said front wall and said side flanges and said front flange are stepped to matingly engage one another when the case is closed and seal out dust and dirt.

* * * * *